(12) United States Patent
Parashar et al.

(10) Patent No.: US 10,146,591 B2
(45) Date of Patent: Dec. 4, 2018

(54) SYSTEMS AND METHODS FOR PROVISIONING IN A VIRTUAL DESKTOP INFRASTRUCTURE

(71) Applicant: VMware, Inc., Palo Alto, CA (US)

(72) Inventors: Dhiraj Parashar, San Jose, CA (US); Kenny To, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 308 days.

(21) Appl. No.: 13/782,205

(22) Filed: Mar. 1, 2013

(65) Prior Publication Data

US 2014/0250439 A1 Sep. 4, 2014

(51) Int. Cl.
G06F 9/50 (2006.01)
G06F 9/455 (2018.01)

(52) U.S. Cl.
CPC .......... G06F 9/5083 (2013.01); G06F 9/505 (2013.01); *G06F 2009/4557* (2013.01)

(58) Field of Classification Search
CPC .......... G06F 2009/4557; G06F 9/5083; G06F 9/505; G06F 2209/5022
See application file for complete search history.

(56) References Cited

U.S. PATENT DOCUMENTS

| | | | |
|---|---|---|---|
| 7,941,470 B2 | 5/2011 | Le et al. | |
| 8,095,929 B1 * | 1/2012 | Ji et al. | 718/1 |
| 8,239,646 B2 | 8/2012 | Colbert et al. | |
| 8,307,187 B2 | 11/2012 | Chawla et al. | |
| 8,839,263 B2 * | 9/2014 | Sugai | G06F 9/45558 718/104 |
| 2009/0037680 A1 | 2/2009 | Colbert et al. | |
| 2009/0172666 A1 * | 7/2009 | Yahalom et al. | 718/1 |
| 2010/0070978 A1 * | 3/2010 | Chawla et al. | 718/105 |
| 2010/0281478 A1 * | 11/2010 | Sauls | G06F 9/5077 718/1 |
| 2013/0111470 A1 * | 5/2013 | Bozek | G06F 9/4881 718/1 |
| 2014/0019964 A1 * | 1/2014 | Neuse et al. | 718/1 |

* cited by examiner

*Primary Examiner* — Jacob D Dascomb

(57) ABSTRACT

Systems and methods described herein facilitate provisioning virtual machines (VMs) in a virtual desktop infrastructure (VDI). The VDI includes a virtual desktop management server (VDMS), a VM, and a plurality of datastores. The VDMS includes a management module that is configured to determine a plurality of usage values that are associated with the datastores. The management module is also configured to determine one or more selection penalty values that are associated with one or more thin-provisioned VMs assigned to one or more of the datastores. Further, the management module calculates a plurality of capacity values for the datastores based at least in part on the determined usage values and the determined penalty values such that each of the capacity values corresponds to a separate datastore. Based at least in part on the capacity values, the management module is configured to assign the VM to one of the datastores.

20 Claims, 2 Drawing Sheets

SYSTEMS AND METHODS FOR PROVISIONING IN A VIRTUAL DESKTOP INFRASTRUCTURE

BACKGROUND

Virtual Desktop Infrastructure (VDI) refers to a system of providing complete centrally-managed desktops to users using computer virtualization technology. VDI is used to create a large number of independent computing environments for a large number of users. The desktop users may be grouped together based on similar software and computing needs. The desktops themselves are correspondingly grouped together in desktop pools that may be provisioned, managed, and deleted as single entities. In the VDI, each desktop is exported to the user from a virtual machine (VM) that is assigned to the user. The desktop pools are associated with resources in the datacenter, including, but not limited to, compute resources, memory, network, and storage.

When a VM is first created, the VM is assigned an area of storage from pools of available storage. Known shared storage may be provided from sources such as locally-attached storage, a storage area network (SAN), network-attached storage (NAS), and other similar systems. In some known methods of storage allocation, a VM is assigned a fixed amount of storage, and this storage is dedicated to the VM. However, such methods often waste storage due to over-allocation. For example, a VM may be created with 20 Gigabytes (GB) of storage from a storage pool, but may only store 5 GB of data, leaving 15 GB of storage that is unused. Moreover, this unused storage may never be used, as the VM may never need to grow beyond 5 GB.

To avoid or to substantially reduce such waste, some VMs may be created as thin-provisioned virtual machines. Thin provisioning, in the context of storage, refers to the known technique of allocating storage to a VM on demand, or at the time the storage is needed. For example, a thin-provisioned VM may be created with an upper limit of 20 GB, but a thin-provisioned storage pool will only give the VM the amount of storage it currently needs, i.e. 5 GB. In the shared storage pool, the unused 15 GB remains unallocated and available for other VM's to potentially use. Although thin provisioning of storage pools helps avoid wasting storage, this technique manifests a potential problem of over-allocation. For example, when more space is promised to a number of VMs than is available in the storage pool, the storage pool is considered "over-committed." If all of the VMs consume all of the storage that they are promised, the storage pool may not be able to satisfy its obligations to each of the VMs. The more over-committed a storage pool becomes, the greater the risk that the storage pool may become full.

During creation of new VMs, the VDI allocates storage to the new VM from a group of potential storage areas, or datastores. The VDI may make the decision as to which datastore the VM will be assigned. However, each datastore may have several VMs already assigned to it. Some of the VMs may be thin-provisioned VMs. Further, some of the thin-provisioned VMs may have been recently created, and may not yet be consuming much space. As such, if the VDI merely considers the capacity currently being consumed from a given datastore, and compares each of the datastores based on the currently available capacity, the space required by new VMs in a given datastore may be underestimated, and may result in a single datastore being repeatedly selected for creation of new VMs regardless of recent assignments.

SUMMARY

Systems and methods described herein facilitate provisioning virtual machines (VMs) in, for example, a virtual desktop infrastructure (VDI), based on storage statistics such that thin-provisioned VMs are considered and accounted for, and such that datastores that have been assigned to host new VMs are penalized and removed from consideration. More specifically, the embodiments described herein include a plurality of datastores, a VM, and a virtual desktop management server (VDMS). The VDMS includes a management module that is configured to determine a plurality of usage values that are associated with the datastores. The management module is also configured to determine one or more selection penalty values that are associated with one or more thin-provisioned VMs assigned to one or more of the datastores. Further, the management module calculates a plurality of capacity values for the datastores based at least in part on the determined usage values and the determined penalty values such that each of the capacity values corresponds to a separate datastore. Based at least in part on the capacity values, the management module is configured to assign the VM to one of the datastores.

DETAILED DESCRIPTION

Figure 1:
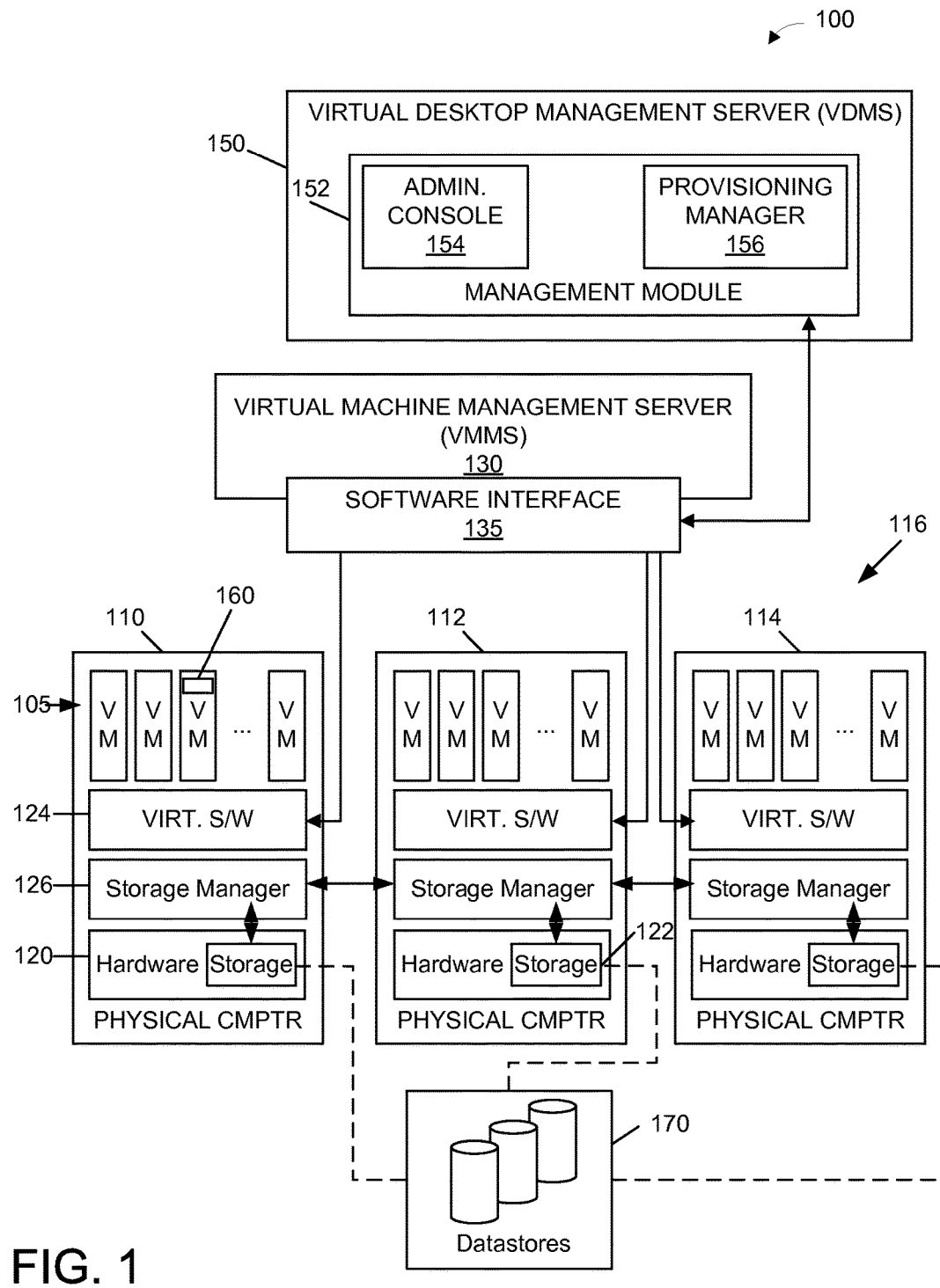
FIG. 1 is a block diagram of an exemplary virtual desktop infrastructure (VDI) having access to several datastores.

FIG. 1 is an exemplary virtual desktop infrastructure (VDI) 100 that includes a plurality of virtual machines (VMs) 105 having access to a plurality of datastores 170. VMs 105 are included on physical computer systems, or hosts, 110, 112, and 114, collectively known as a cluster 116. Each VM 105 provides a "desktop" 160 (only one being shown in FIG. 1) to a user of VMs 105. Desktop 160 is an interactive user environment provided by a guest operating system and applications running within VM 105, and generally includes a graphical display, but may include other outputs, such as audio, indicator lamps, tactile feedback, etc. Desktop 160 also accepts input from the user in the form of device inputs, such as keyboard and mouse inputs. In addition to user input/output, desktop 160 may send and receive device data, such as input/output for a FLASH memory device local to the remote user, or to a local printer.

Each physical computer 110, 112, and 114, includes hardware 120 and virtualization software, or manager, 124 running on hardware 120. One or more of the VMs 105 are executing on hardware 120 by way of virtualization software 124. Virtualization software 124 is therefore logically interposed between, and interfaces with, hardware 120 and VMs 105. Virtualization software 124 may be implemented directly in hardware 120, e.g., as a system-on-a-chip, firmware, FPGA, etc. Hardware 120 includes at least one processor (not shown), wherein each processor is an execution unit, or "core," on a microprocessor chip. Hardware 120 also includes system memory (not shown), which is general volatile random access memory (RAM), a network interface port (NIC), a storage system 122, and other devices. Storage system 122 may include one or more non-volatile storage devices (not shown), such as hard disk drives, solid state drives (SSD), and the like, as well as access to shared storage areas such as a storage area network (SAN), network-attached storage (NAS), and other similar systems. Virtualization software 124 is sometimes referred to as a hypervisor, and includes software components for managing hardware resources and software components for virtualizing or emulating physical devices to provide virtual devices, such as virtual disks, virtual processors, virtual network interfaces, etc., for each VM 105. Each VM 105 is an abstraction of a physical computer system and may include an operating system (OS) such as Microsoft Windows® and applications, which are referred to as the "guest OS" and "guest applications," respectively, wherein the term "guest" indicates it is a software entity that resides within VM 105. Virtualized storage devices are used to store the guest OS, guest applications, and guest files. Virtualized storage devices such as virtual disks may be backed by virtual disk image files on storage systems 122 within one or more datastores 170, as described in U.S. Pat. No. 8,307,187 to Chawla et al., granted Nov. 6, 2012, and entitled, "VDI Storage overcommit and rebalancing" and incorporated herein by reference in its entirety. The disk type for each VM 105 may include, for example, a full disk, a delta disk, a linked clone, or a synchronized clone.

Each physical computer 110, 112, and 114 includes a storage manager 126 that manages each respective storage system 122. Storage manager 126 is configured to provide a storage layer abstraction that includes virtual, or logical, shared storage using storage systems 122. As such, datastores 170 may be provided by the storage layer abstraction such that virtual disk image files may be stored within the virtual shared storage.

Shared storage that may be accessible by physical computers 110, 112, and 114 enables virtualization software 124 to provide high availability features, such as the ability to restart a VM 105 when a physical computer fails. Using shared storage, VMs 105 can be migrated from one physical computer to another. As shared storage is typically provided by a storage area network (SAN), network-attached storage (NAS), and/or both, virtual disk images are typically stored remotely from the physical computer on which the corresponding VM is executing. The result is latencies much higher than latencies for storage systems 122. Virtual shared storage combines the added features of shared storage while using storage systems 122 for reduced latencies. Virtual disk images may be stored locally with respect to the physical computer on which the corresponding VM 105 is executing. Virtual disk images, or portions thereof, may be replicated to other areas of the virtual shared storage that are stored on other physical computers, thereby providing data redundancy. As storage manager 126 abstracts the virtual shared storage, virtualization software 124 may interact with virtual shared storage as if it were non-virtual shared storage.

In one embodiment, storage manager 126 may be implemented as a virtual storage appliance (VSA). The VSA is software that runs within a VM 105 on each physical computer 110, 112, and 114 to create a storage cluster. The VSA provides virtual shared storage by interfacing directly with storage systems 122 on each respective physical computer 110, 112, and 114, and providing a logical file system that is locally hosted and replicated among storage systems 122 within the storage cluster.

In another embodiment, storage manager 126 may be implemented as a virtual storage area network (VSAN) by virtualization software 124. More particularly, storage manager 126 may consolidate one or more storage systems 122 to create a VSAN interface, e.g., iSCSI, accessible by virtualization software 124. One or more datastores 170 may be stored on one or more logical disks, i.e., LUNs, on the VSAN.

A Virtual Machine Management Server (VMMS) 130 provides a software interface 135 that, among other things, allows other programs to control the lifecycle of VMs 105 running on physical computers 110, 112, 114, that are managed by VMMS 130. VMMS 130 may provide other VM management and manipulations than those specifically mentioned here. A Virtual Desktop Management Server (VDMS) 150 may be a physical computer system or a virtual machine that includes and runs on a management module 152. An exemplary VDMS is described in U.S. patent application Ser. No. 11/395,012, filed Mar. 31, 2006 by Puneet Chawla, et al. Management module 152 manages pools of computer resources to run VMs 105 on a cluster or set of clusters typically containing multiple servers with CPUs, memory, and communications hardware (network). In the embodiment shown in FIG. 1, management module 152 includes a number of modules, including an administrative console 154, and a provisioning manager 156.

Management module 152 interfaces with VMMS 130 using software interface 135 to control VMs 105. For example, VMMS 130 may allow management module 152 to: (a) discover computer, storage, and network resources; (b) create logical compute pools providing features like automatic CPU and memory load balancing; (c) create VMs with one or more virtual disks on local or shared storage, e.g., clones with full or sparse disks; (d) create VMs anchored to a base virtual machine (e.g., as described in U.S. Pat. No. 7,941,470 to Le et al., granted May 10, 2011, and entitled, "Synchronization and customization of a Clone Computer" and incorporated herein by reference in its entirety); (e) monitor storage subsystems, including, but not limited to, storage consumption of individual disks, storage consumption of virtual machines as a single unit and virtual machine file system monitoring (free space, total space, etc); (f) perform power operations on virtual machines (i.e., power on, power-off, suspend, resume, checkpoint, etc.); (g) perform offline migrations of virtual disks from one datastore to another; (h) perform hot storage migration wherein VM disks are migrated during operation of the VM (e.g., as described in U.S. Patent Application Publication No. 2009/0037680 to Colbert et al., which is incorporated herein by reference in its entirety); and (i) provide an out of band communication channel to software programs running inside VMs 105.

Administrative console 154, in the exemplary embodiment, provides a remotely-accessible user interface to an administrator to manage the configuration of desktop pools. In one embodiment, a graphical user interface may be exported via hypertext transfer protocol (HTTP) and accessed by a commodity web browser. Alternatively, a command-line interface or a rich client can be provided to local or remote users. Administrative console 154 allows the administrator to perform a plurality of functions, such as: (a) create desktop pools, as described herein; (b) associate desktop pools with VDMS 150; (c) associate a desktop pool with a master image; and (d) define VM state policies, etc.

Provisioning manager 156, in the exemplary embodiment, is configured to coordinate the provisioning, or creation, of virtual shared storage, the provisioning of VMs 105 on physical computers 110, 112, and 114, and the provisioning of VMs 105 to datastores 170. Provisioning manager 156 may be accessed via a web interface provided by admin console 154. Provisioning manager 156 also communicates with VMMS 130, virtualization software 124, and/or storage manager 126 using application programming interfaces (APIs) and/or any suitable communication framework. Provisioning manager 156 is generally used by an administrator to assign or reassign VMs 105 to datastores 170, as explained in more detail herein.

During operation of VDI 100, as explained in more detail with respect to FIG. 2 below, VDMS 150 enables the provisioning and/or rebalancing of VMs 105 based on storage statistics such that thin-provisioned VMs are considered and accounted for, and such that the datastores that have been assigned to new VMs are penalized and removed from consideration. For example, a user, such as an administrator of VDI 100, initiates creation of one or more new VMs using provisioning manager 156. Creation of a new VM may involve semi-automated or fully-automated allocation of one of the datastores to each of the new VMs, wherein the allocation of the datastores is based on various factors. For example, in one embodiment, a user may provide to provisioning manager 156 a list that includes the datastores that are to be considered for use when allocating the new VMs. Alternatively, the user may input or provide a list of the datastores that the user may want to restrict or remove from consideration during the datastore allocation of these new VMs 105. Based on the data provided on such user-provided lists, provisioning manager 156 may then allocate or rebalance the VMs.

In some embodiments, some of the datastores may be removed from consideration directly by provisioning manager 156 based on various threshold considerations, such as current available capacity or a current over-commit factor. For example, provisioning manager 156 may automatically not consider any datastores that are currently above a pre-defined threshold capacity value, such as above 95% capacity. Provisioning manager 156 may automatically not consider any datastores that have an over-commit factor greater than a pre-defined threshold value, such as greater than 3.0 (i.e., 3 Gigabytes (GB) of logical virtual disk space for every 1 GB of actual space within a datastore). In some embodiments, provisioning manager 156 may consider a list of datastores 170 that is provided by the user and then remove datastores 170 based on the aforementioned threshold considerations. After taking into account the various considerations, provisioning manager 156 generates a list of candidate storage pools that it may consider when allocating the new VMs.

Based on the candidate storage pools that are on the generated list, provisioning manager 156, in the exemplary embodiment, may then assign VMs to candidate storage pools one at a time. In the exemplary embodiment, provisioning manager 156 determines a capacity value by calculating a population density for each candidate storage pool. In the exemplary embodiment, the population density for a given storage pool is calculated by considering usage value factors and penalty factors. As described below, usage value factors include total capacity, currently-available free space, an over-commit factor, and swap space. These usage values are gathered from data about the storage pools that may be maintained by, for example, provisioning manager 156. Alternatively, any source of data about the storage pools may be used. For example, provisioning manager 156 may query each of the candidate storage pools for usage values.

With respect to the population density calculation, total capacity represents the total size of the datastore, usually expressed in GB. Currently-available free space refers to the portion of the datastore that has not yet been consumed (i.e., space that is available for assignment or use). Space is considered consumed when it has been consumed by virtual disk image and other files corresponding to a VM. In the case of traditionally-provisioned VMs, each traditionally-provisioned VM consumes datastore space equal to at least the entire capacity of its virtual disk. For example, a traditionally-provisioned VM having a 20 GB capacity virtual disk is represented by one or more disk image files that consume 20 GB from the storage pool, even though it may only contain 5 GB of useful data. Thus, during free-space calculation, the 20 GB will be considered consumed and will not be considered free space. On the other hand, in the case of thin-provisioned VMs, a thin-provisioned VM with a 20 GB capacity virtual disk, and thus having an allocated or logical size of 20 GB, but storing only 5 GB of data, is considered to be consuming only 5 GB from the storage pool. Therefore, during free-space calculation, only the 5 GB will be considered consumed, leaving the other 15 GB as free space.

The population density calculation also includes an over-commit factor. An over-commit factor is a ratio of the amount of space promised to thin-provisioned VMs 105 but not yet used, and may be relative to the total capacity of the datastore or to the currently-available capacity of the datastore. For example, a 100 GB datastore having 5 thin-provisioned VMs, each having virtual disks with 50 GB of logical capacity (for a total of 250 GB), would have an overcommit factor of 2.5. Alternatively, other calculations and/or representations for an over-commit factor may be used. For example, in one embodiment, an over-commit factor may represent a measure of the amount of storage promised to thin-provisioned VMs 105 but not yet consumed within the datastore. Further, the population density calculation may also consider swap space. Swap space refers to space utilized for swap files and temporary or transient files created by VMs 105 during shutdown or power-up. In some embodiments, this value may be zero, for example, when no swap space is required of the datastore.

In the exemplary embodiment, the population density calculation also includes penalty values that are based on thin-provisioned VMs. For example, in some embodiments, datastores that have one or more thin-provisioned VMs already assigned to them may have penalty values associated with the datastore, which may be used during the calculation of the datastore's population density. As such, these datastores may be less likely to be considered during the allocation of VMs.

The penalty values, in the exemplary embodiment, are created and managed by provisioning manager 156 and stored in a memory within VDMS 150. For example, in some embodiments, when a new VM is first created and assigned to a datastore 170, provisioning manager 156 associates a penalty value with that particular datastore 170. The penalty value has both a magnitude and a duration. The penalty value's duration, in some embodiments, is managed using a creation time for the VM, such that the penalty value will expire and be removed after a pre-defined period of time, such as, for example, after 30 minutes. In other embodiments, the penalty value may expire after an estimated "steady-state size" of the VM has been approached or exceeded. In still other embodiments, the penalty value may expire when the memory is refreshed, as described below.

In the exemplary embodiment, the penalty value is based on the estimated steady-state size of the new VM. For example, a new VM having an estimated steady-state usage of 5 GB may have an associated penalty value of 5 GB. In other embodiments, a pre-defined penalty value may be used for each VM. The pre-defined penalty value may be defined by the user and/or determined by provisioning manager 156.

The penalty value may also be calculated by reducing either the steady-state usage or the pre-defined penalty value by the amount currently being used by the new VM.

Population density for a candidate datastore, in the exemplary embodiment, is calculated based on both the usage values of the datastore as well as any active penalty values for the datastore. In the exemplary embodiment, a datastore's population density, at the time of computation, can be determined using Equation 1 below.

$$\text{Population Density} = \frac{(\text{capacity} - \text{free space} + \text{swap space} + \text{penalty})}{(\text{capacity} * \text{overcommit factor})} \quad \text{Eq. 1}$$

In Equation 1, the over-commit factor is a unitless ratio, as described above, and all other variables are in storage units, such as GB. In the exemplary embodiment, a higher population density datastore is less favorable to taking new VMs 105 than a lower population density datastore.

In the exemplary embodiment, the population densities are computed for each candidate datastore based on existing conditions at the time of provisioning each new VM. During provisioning of each new VM, the datastore with the least population density is determined and then assigned for use. Once assigned to the new VM, the datastore is also given a penalty value. This penalty value facilitates increasing the perceived population density of the datastore hosting the thin-provisioned VM, and this datastore will be less likely to be selected for allocation of other new VMs. For example, during a creation task for several new thin-provisioned VMs, an administrator may select three candidate datastores from the available pool of datastores 170. During the assignment of a candidate datastore to a first VM, a first datastore may be found to have a slightly lower population density than the other two candidate datastores. The first VM is then assigned to that first datastore. However, because the first VM is a thin-provisioned VM, little or no actual use of the first datastore may occur before a second VM is analyzed. If no penalty is applied to the first datastore, then that first datastore may appear less dense then the other two candidate datastores, and may be selected again.

The application of a penalty value facilitates adding a penalty to the available capacity such that the population density for the particular datastore more closely reflects steady state usage of the first VM. During the assignment of a candidate datastore to the second VM, the first datastore will be weighted with the penalty value from the first VM assignment. As such, a different candidate datastore may be less dense than the first datastore, and may be selected and assigned to the second VM. Without the penalty value, the datastore initially having the lowest density may have been selected for all of the VMs in the current creation task. Such a selection may be detrimental because the first VM has not yet grown to consume any significant storage, and therefore the datastore's current capacity values are not accurate relative to the first VM. Because of the nature of thin-provisioned VMs and the VM creation process, applying a penalty value to the population density of a datastore during new VM creation facilitates avoiding stacking too many new VMs on a single datastore before the new VMs have had a chance to impact actual capacity of the datastores. Accordingly, applying transient penalty values to datastores after new provisioning of thin-provisioned VMs facilitates avoiding storage distribution problems caused during VM provisioning.

Figure 2:
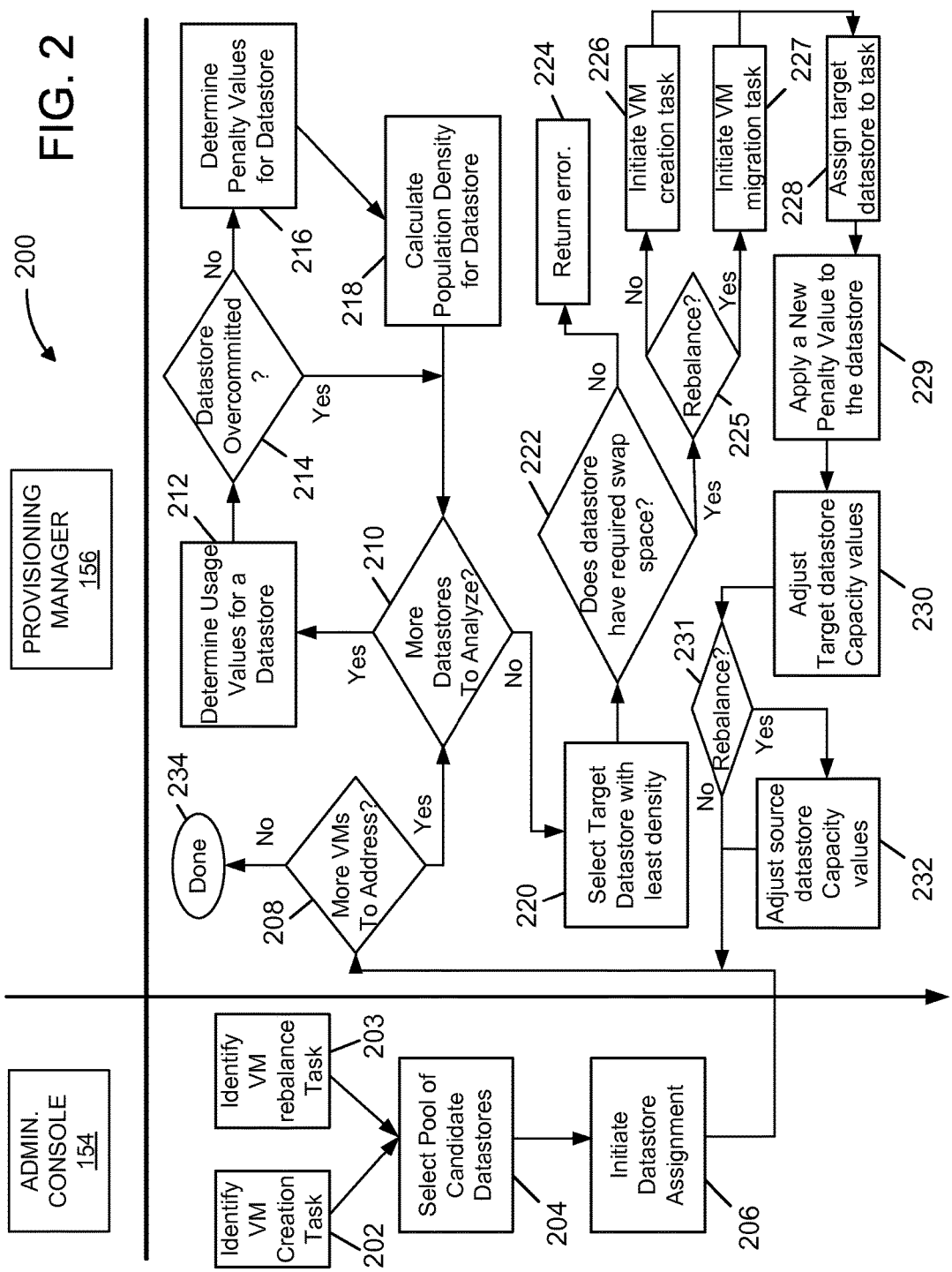
FIG. 2 is a swimlane diagram of an exemplary method for in the VDI shown in FIG. 1.

FIG. 2 is a swimlane diagram 200 of an exemplary method for provisioning VMs 105 (shown in FIG. 1) to datastores 170 (shown in FIG. 1). This method may be used with VDMS 150 (shown in FIG. 1) and/or VMMS 130 (shown in FIG. 1), and may be embodied within a plurality of computer-executable instructions stored in one or more memories, such as one or more computer-readable storage mediums. Computer storage mediums may include non-transitory storage medium such as volatile and nonvolatile random access memory, removable and non-removable mediums implemented in any method or technology for storage of information such as computer-readable instructions, data structures, program modules or other data. The instructions are executed by one or more processors to perform the functions described herein.

The method described herein is executed or performed by a provisioning manager, such as provisioning manager 156, for provisioning storage to VMs 105 in VDI 100 (shown in FIG. 1). In operation 202, an administrator, using administration console 154, identifies a VM creation task. More specifically, the administrator identifies a VM creation task that requires creation of one or more new VMs for VDI 100 (shown in FIG. 1). Each newly created VM will require an assignment of a datastore, such as one of the datastores 170 (shown in FIG. 1), which is used as the initial operating system installation storage space for the VMs. Alternatively, rather than identify a VM creation task, the administrator may identify a rebalancing task in operation 203. More specifically, the administrator may identify a VM rebalance task that requires movement of one or more existing VMs. Such re-assignment of a VM from one datastore to another involves a source datastore (i.e., which datastore currently hosts the VM), a target datastore (i.e., which datastore will eventually host the VM), and a decision as to which datastore will be the target datastore. For example, the administrator may identify an over-utilized datastore and may identify an existing VM using that datastore as a candidate to vacate that datastore.

The administrator, via administration console 154, also selects a pool of candidate datastores from the datastores 170 available to VDI 100 in operation 204. For example, VDI 100 may have 10 datastores currently configured and visible to VDI 100. Administrator may select a subset of these 10 datastores for the VM creation task, thereby limiting the pool of datastores utilized for creation of these new VM's by this method. For example, in the exemplary embodiment, the administrator may select 3 of the 10 available datastores. As such, only these 3 datastores may be selected as potential candidate datastores for all of the VM's associated with the present creation task. In some embodiments, this subset of datastores may default to all available datastores 170 currently available to VDI 100. In other embodiments, datastores that are already full or datasets that are consumed above a certain pre-defined threshold may be excluded by default from the subset. Further, in some embodiments, the selection of candidate datastores may be automated and no administrator intervention may be necessary.

Once the pool of candidate datastores has been selected, the administrator, via administration console, initiates the datastore assignment in operation 206. Provisioning manager 156 begins a cycle of assigning datastores from the subset of candidate datastores to each of the VMs in the present task. More specifically, in the exemplary embodiment, provisioning manager 156 assigns datastores to each VM one at a time, in operation 208, until all the VMs have a datastore assigned. In operation 210, provisioning manager 156 begins addressing a current VM by determining if there are any more datastores to analyze. If there are no more candidate datastores to analyze, then provisioning manager selects the datastore having the least dense population density in operation 220. If, however, there are more candidate datastores to analyze, then one or more usage values for a candidate datastore is determined in operation 212. The usage values include statistics about the datastore's current state, such as current capacity and current free space, and are used for the assignment process as discussed in further detail below.

Other VMs may have been provisioned between the time the subset of datastores are selected and the time that provisioning manager 156 considers the next VM. For example, if 3 datastores are selected and there are 12 VMs to be provisioned from those 3 datastores, the storage values for each datastore may have significantly changed by the time provisioning manager 156 addresses the final VM. As such, in some embodiments, a datastore whose usage exceeds a predefined usage threshold, or whose overcommit ratio exceeds a predefined threshold, may be excluded from consideration during the present creation task. For example, in operation 214, provisioning manager 156 identifies whether the current candidate datastore is overcommitted. If a datastore is currently overcommitted (i.e., if the datastore has a current capacity over a predefined threshold value), then the overcommitted candidate datastore will no longer be considered for the VM, and provisioning manager analyzes the next candidate datastore. In operation 216, provisioning manager 156 determines a penalty value for the datastores that were identified as not being overcommitted. As described above, each datastore may have been associated with one or more penalty values. These penalty values may be transient and may fluctuate based on recent assignments. For example, one datastore may already have a VM assigned to it and this assignment may have a penalty value associated with it. During subsequent assignments, provisioning manager 156 includes the penalty value of this assignment during analysis of this datastore, thereby potentially favoring the other candidate datastores.

In operation 218, provisioning manager 156 calculates a population density for the candidate datastores. The population density calculation for each datastore, described in detail above, includes considerations of both the current usage values of the datastore and any penalty values associated with the datastore. In some embodiments, a current lowest-density datastore may be tracked and subsequently replaced by a datastore having a lower density. Provisioning manager 156 then identifies again whether there are any more candidate datastores to analyze pursuant to operation 210. If there are more candidate datastores to analyze, then provisioning manager repeats the process in operations 212-218. If, however, there are no more candidate datastores to analyze, then provisioning manager selects the datastore having the least dense population density pursuant to operation 220. In the exemplary embodiment, after the least dense datastore is selected, the selected datastore is further analyzed, in operation 222, to identify whether the datastore continues to have enough space for required swap files associated with the datastore (i.e., required swap space). If the datastore does not have the required swap space, then an error is returned in operation 224 and the datastore is not used. If the datastore has the required swap space, then the datastore will be used for the present task.

If, however, the data does have the required swap space, then provisioning manager 156 identifies whether it will need to perform a rebalance in operation 225. If provisioning manager 156 determines that it is not performing a rebalance, then provisioning manager 156 creates a new VM pursuant to operation 226. In some embodiments, the VM is immediately created with the assigned datastore. The VM may proceed with a load process while provisioning manager 156 continues with the complete VM creation task. However, if provisioning manager 156 identifies that it needs to perform a rebalance, then a VM storage migration task is initiated pursuant to operation 227. The selected datastore is used as the target datastore for the movement task. The storage migration for the VM may proceed while provisioning manager 156 continues with the remainder of the rebalance task. Storage migration may proceed while a VM is executing, which is referred to as a "live storage migration." Live storage migration is described in U.S. Pat. No. 8,239,646, which was granted Aug. 7, 2012 and is incorporated herein by reference.

In the exemplary embodiment, whether the VM is newly created or its an existing VM being moved, the VM is assigned to a datastore in operation 228. Once the VM has been assigned to a datastore, a new penalty value is assigned to the datastore in operation 229. In some embodiments, provisioning manager 156 stores information regarding the assignment and the presence of penalty values associated with each datastore. For example, provisioning manager 156 may store the penalty value information in a cache (not shown). When future calculations involving the datastore are required, the cache may be utilized to identify any penalty values associated with the datastore. Existing values for the datastore may then be adjusted in operation 230. For example, cache values associated with the datastore, such as free space or over-committed usage, may be adjusted based on the recent assignment of the present VM to this datastore. If the VM was an existing VM that was being moved or rebalanced, the source datastore may also have existing values adjusted in operation 232. For example, cache values associated with the source datastore may be adjusted, such as increasing free space based on the reassignment of the present VM away from the source datastore.

Once provisioning manager 156 has completed the assignment of the selected datastore to the VM and applied any appropriate penalty values to the datastore, provisioning manager 156 analyzes whether there are any more VMs to be addressed in operation 208. If another VM needs to be addressed, then provisioning manager 156 repeats operations 210-232 for the next VM and all of the VMs in the current creation task. During subsequent iterations, the penalty values of prior assignments are included in the analysis and may include any natural changes to the usage values for each of the candidate datastores. The application and subsequent consideration of penalty values associated with VM assignments to datastores facilitates reducing the over-utilization of a single datastore. If, however, there are no other VMs to address, then provisioning manager 156 is done with the entire task in operation 234.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware, or implemented with traditional virtualization or paravirtualization techniques. Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computing system, comprising:
   a plurality of datastores configured to store data on hardware devices;
   a virtual machine (VM) to be assigned to at least one of the plurality of datastores; and
   a virtual desktop management server (VDMS) running on a computing device, wherein the VDMS executes a set of operations including:
      determining a plurality of usage values that are associated with said plurality of datastores, the plurality of usage values include a capacity of each of said plurality of datastores;
      applying one or more selection penalty values to at least one datastore if said datastore has previously been assigned one or more thin-provisioned VMs, wherein a thin-provisioned VM is a VM to which storage is allocated on demand, wherein the one or more selection penalty values applied to the datastore reduce a probability that the datastore will be selected for allocation of the VM, and wherein each selection penalty value has a duration that is managed using a creation time of the one or more thin-provisioned VMs such that the selection penalty value of the datastore expires and is removed from the datastore after a pre-defined period of time;
      calculating a plurality of population density values for said plurality of datastores based at least in part on the plurality of usage values and the one or more selection penalty values such that each of the plurality of population density values corresponds to a separate datastore of said plurality of datastores;
      selecting one datastore of said plurality of datastores based at least in part on the population density value of the one datastore and assigning the VM to the selected one datastore, wherein at least one datastore having one or more thin-provisioned VMs is removed from consideration during the selecting due to application of the one or more selection penalty values; and
      provision said VM on the selected one datastore of said plurality of datastores.

2. The computing system of claim 1, wherein the VDMS determines the one or more selection penalty values based at least in part on a target storage size associated with the one or more thin-provisioned VMs.

3. The computing system of claim 1, wherein the VDMS calculates the population density of each of said plurality of datastores based at least in part on a storage capacity of each of said plurality of datastores.

4. The computing system of claim 1, wherein the VDMS calculates the population density of each of said plurality of datastores based at least in part on an over-commit factor associated with each of said plurality of datastores.

5. The computing system of claim 1, wherein the VDMS assigns said VM by selecting a datastore of said plurality of datastores having a population density that is below a predefined threshold.

6. The computing system of claim 1, wherein the plurality of usage values that are associated with said plurality of datastores further comprise at least one of:
total capacity of the dafastore, currently available free space on the datastore, an over-commit factor of the datastore or swap space on the datastore.

7. The computing system of claim 1, wherein:
the VDMS updates a selection penalty of the one datastore to reflect the VM assigned to the one datastore if the assigned VM is a thin-provisioned VM.

8. The computing system of claim 1, wherein the duration of the one or more penalty values is based on a steady-state size of the one or more thin-provisioned VMs such that the one or more selection penalty values expire when the one or more thin-provisioned VMs reach or exceed the steady-state size on the at least one datastore.

9. At least one non-transitory computer readable storage medium having computer-executable instructions embodied thereon, wherein, when executed by at least one processor, the computer-executable instructions cause the at least one processor to:
determine a plurality of usage values that are associated with a plurality of datastores, the plurality of usage values include a capacity of each of said plurality of datastores;
apply one or more selection penalty values to at least one datastore if said datastore has previously been assigned one or more thin-provisioned virtual machines (VMs), wherein a thin-provisioned VM is a VM to which storage is allocated on demand, wherein the one or more selection penalty values applied to the datastore reduce a probability that the datastore will be selected for allocation of the VM, and wherein each selection penalty value has a duration that is managed using a creation time of the one or more thin-provisioned VMs such that the selection penalty value of the datastore expires and is removed from the datastore after a pre-defined period of time;
calculate a plurality of population density values for the plurality of datastores based at least in part on the plurality of usage values and the one or more selection penalty values such that each of the plurality of population density values corresponds to a separate datastore of the plurality of datastores;
select one datastore of the plurality of datastores based at least in part on the population density value of the one datastore and assign the VM to the selected one datastore, wherein at least one datastore having one or more thin-provisioned VMs is removed from consideration during the selecting due to application of the one or more selection penalty values; and
provision said VM on the selected one datastore of said plurality of datastores.

10. The at least one non-transitory computer-readable storage medium of claim 9, wherein the computer-executable instructions cause the at least one processor to determine the one or more selection penalty values based at least in part on a target storage size associated with the one or more thin-provisioned VMs.

11. The at least one non-transitory computer-readable storage medium of claim 9, wherein the computer-executable instructions cause the at least one processor to calculate the population density of each of the plurality of datastores based at least in part on a storage capacity of each of the plurality of datastores.

12. The at least one non-transitory computer-readable storage medium of claim 9, wherein the computer-executable instructions cause the at least one processor to calculate the population density of each of the plurality of datastores based at least in part on an over-commit factor associated with each of the plurality of datastores.

13. The at least one non-transitory computer-readable storage medium of claim 9, wherein the computer-executable instructions cause the at least one processor to assign the VM by selecting a datastore of the plurality of datastores having a population density that is below a predefined threshold.

14. The at least one non-transitory computer-readable storage medium of claim 9, wherein the plurality of usage values that are associated with said plurality of datastores further comprise at least one of:
total capacity of the datastore, currently available free space on the datastore, an over-commit factor of the datastore or swap space on the datastore.

15. The at least one non-transitory computer-readable storage medium of claim 9, wherein the computer-executable instructions cause the at least one processor to:
update a selection penalty of the one datastore to reflect the VM assigned to the one datastore if the assigned VM is a thin-provisioned VM.

16. The at least one non-transitory computer-readable storage medium of claim 9, wherein the duration of the one or more penalty values is based on a steady-state size of the one or more thin-provisioned VMs such that the one or more selection penalty values expire when the one or more thin-provisioned VMs reach or exceed the steady-state size on the at least one datastore.

17. A method of provisioning a virtual desktop infrastructure, the method comprising:
determining a plurality of usage values that are associated with a plurality of datastores, the plurality of usage values include a capacity of each of said plurality of datastores;
applying one or more selection penalty values to at least one datastore if said datastore has previously been assigned one or more thin-provisioned virtual machines (VMs), wherein a thin-provisioned VM is a VM to which storage is allocated on demand, wherein the one or more selection penalty values applied to a datastore reduce a probability that the datastore will be selected for allocation of the VM, and wherein each selection penalty value has a duration that is managed using a creation time of the one or more thin-provisioned VMs such that the selection penalty value of the datastore expires and is removed from the datastore after a pre-defined period of time;
calculating a plurality of population density values for the plurality of datastores based at least in part on the plurality of usage values and the one or more selection penalty values such that each of the plurality of population density values corresponds to a separate datastore of the plurality of datastores;
selecting one datastore of the plurality of datastores based at least in part on the population density value of the one datastore and assigning the VM to the selected one datastore, wherein at least one datastore having one or more thin-provisioned VMs is removed from consideration during the selecting due to application of the one or more selection penalty values; and provisioning said VM on the selected one datastore of said plurality of datastores.

18. The method of claim 17, wherein the plurality of usage values that are associated with said plurality of datastores further comprise at least one of:
total capacity of the datastore, currently available free space on the datastore, an over-commit factor of the datastore or swap space on the datastore.

19. The method of claim 17, further comprising:
updating a selection penalty of the one datastore to reflect the VM assigned to the one datastore if the assigned VM is a thin-provisioned VM.

20. The method of claim 17, wherein the duration of the one or more penalty values is based on a steady-state size of the one or more thin-provisioned VMs such that the one or more selection penalty values expire when the one or more thin-provisioned VMs reach or exceed the steady-state size on the at least one datastore.

* * * * *